(12) United States Patent
Wu et al.

(10) Patent No.: US 9,704,611 B2
(45) Date of Patent: Jul. 11, 2017

(54) COMPOSITE STRUCTURE OF GRAPHENE AND CARBON NANOTUBE AND METHOD OF MANUFACTURING THE SAME

(71) Applicant: Enerage Inc., Yilan County (TW)

(72) Inventors: Mark Y. Wu, Yilan County (TW); Cheng-Yu Hsieh, Yilan County (TW); Cheng-Shu Peng, Yilan County (TW)

(73) Assignee: ENERAGE INC., Yilan County (TW)

( * ) Notice: Subject to any disclaimer, the term of this patent is extended or adjusted under 35 U.S.C. 154(b) by 140 days.

(21) Appl. No.: 14/748,954

(22) Filed: Jun. 24, 2015

(65) Prior Publication Data
US 2016/0329120 A1 Nov. 10, 2016

(30) Foreign Application Priority Data
May 7, 2015 (TW) .............................. 104114561 A

(51) Int. Cl.
| | | |
|---|---|---|
| *H01B 1/04* | (2006.01) | |
| *C23C 18/08* | (2006.01) | |
| *H01F 1/42* | (2006.01) | |
| *C01B 31/02* | (2006.01) | |
| *C01B 31/04* | (2006.01) | |
| *C09K 5/14* | (2006.01) | |

(52) U.S. Cl.
CPC ........... *H01B 1/04* (2013.01); *C01B 31/0233* (2013.01); *C01B 31/0438* (2013.01); *C23C 18/08* (2013.01); *H01F 1/42* (2013.01); *C09K 5/14* (2013.01)

(58) Field of Classification Search
CPC .. H01B 1/04; C23C 18/08; H01F 1/42; C09K 5/14
USPC ........................................................ 428/403
See application file for complete search history.

(56) References Cited

U.S. PATENT DOCUMENTS

| | | | | |
|---|---|---|---|---|
| 8,315,039 | B2* | 11/2012 | Zhamu ................... | B82Y 30/00 361/502 |
| 8,872,140 | B2* | 10/2014 | Jung ..................... | A61N 5/1077 250/423 P |
| 8,947,854 | B2* | 2/2015 | Zhamu ................... | H01G 11/36 361/502 |
| 9,017,756 | B2* | 4/2015 | Zhamu ................... | B82Y 30/00 361/502 |
| 9,056,778 | B2* | 6/2015 | Wu ....................... | C01B 31/0438 |
| 2011/0157772 | A1* | 6/2011 | Zhamu ................... | B82Y 30/00 361/502 |
| 2011/0165321 | A1* | 7/2011 | Zhamu ................... | B82Y 30/00 427/79 |
| 2014/0030590 | A1* | 1/2014 | Wang ..................... | H01B 1/04 429/211 |
| 2014/0098461 | A1* | 4/2014 | Zhamu ................... | H01G 11/36 361/502 |
| 2015/0086881 | A1* | 3/2015 | Zhamu ................... | H01G 11/68 429/405 |

* cited by examiner

*Primary Examiner* — Leszek Kiliman
(74) *Attorney, Agent, or Firm* — Muncy, Geissler, Olds & Lowe, P.C.

(57) ABSTRACT

The present invention discloses a composite structure of graphene and carbon nanotube and a method of manufacturing the same. The composite structure includes graphene platelets and carbon nanotubes, each carbon nanotube growing perpendicular to the planar surface of the graphene platelet. The method includes steps of graphene platelets preparation, chemical precipitation, chemical reduction and carbon nanotube growth. Metal particles are first formed on the graphene platelets through the steps of chemical precipitation and electrochemical reduction, and carbon nanotubes grow in the step of carbon nanotube growth through thermal treatment. Thus, the graphene platelets and the carbon nanotubes of the present invention form a three dimensional structure, and the carbon nanotubes are used as three dimensional spacers and configured between the graphene platelets, which are effectively separated and hard to aggregate or congregate together.

6 Claims, 4 Drawing Sheets

(a)

(b)

COMPOSITE STRUCTURE OF GRAPHENE AND CARBON NANOTUBE AND METHOD OF MANUFACTURING THE SAME

CROSS-REFERENCE TO RELATED APPLICATION

This application claims the priority of Taiwanese patent application No. 104114561, filed on May 7, 2015, which is incorporated herewith by reference.

BACKGROUND OF THE INVENTION

1. Field of the Invention

The present invention generally relates to a composite structure and a method of manufacturing the same, and more specifically to a composite structure combining graphene platelets and carbon nanotubes with an axial direction of each carbon nanotube perpendicular to a planar direction of a planar surface of the corresponding graphene platelet to effectively separate and prevent the graphene platelets from congregating together with a three dimensional spacer formed of the carbon nanotubes for enhancing excellent performance of the graphene platelets to the actual applications, and a method of manufacturing the same.

2. The Prior Arts

Since Geim and Konstantin Novoselov successfully developed the process of tape exfoliation to obtain mono layer graphite (or called graphene) at University Manchester in 2004 and won the 2010 Nobel Prize for physics, the related industries have continuously tried to apply the excellent performance of graphene to various fields. Specifically, graphene is substantially formed of a mono layer of carbon atoms, which are tightly bonded with $sp^2$ hybrid orbital in a two-dimensional form of hexagonal honeycomb crystal. The chemical bond for graphene is a graphitic bond, which is a hybrid bond of covalent and metal bonds. Thus, graphene inherently exhibits excellent thermal conductivity and electrical conductivity. For instance, the electronic mobility of graphene is even higher than that of carbon nanotube and silicon crystal at room temperature. Additionally, graphene has lower resistivity than copper and silver.

Furthermore, graphene has a thickness only one carbon diameter about 0.335 nm, its mechanical strength is higher than that of steel by hundreds of times, and its density is only one fourth of steel such that graphene is the thinnest and hardest material in the world. In particular, graphene possesses thermal conductivity higher than carbon nanotube and adamant, even theoretically up to 5300 W/mK, and is thus an excellent material for heat conduction and thermal dissipation.

Traditionally, the process of forming graphene generally comprises three primary types, including defoliation, direct growth and carbon nanotube conversion. The process of defoliation is more practical for mass production because graphene obtained is in a form of powder. One of the key aspects of the defoliation process is the chemical reaction including oxidization and reduction. A graphitic material is first oxidized to form graphite oxide, and separation and reduction are performed to obtain grapheme material.

Therefore, it is necessary for various applications to make graphene more controllable by chemically or physically modifying graphene. For instance, three dimensional spacers are used to modify graphene such that individual graphene platelets are separated and can be easily dispersed, instead of easily congregating or stacking up together.

In addition, graphene and carbon nanotube are advantageous in the field of transparent electrodes because of high flexibility and low reflectivity, and also one of good options for flexible electronic material. Further, graphene exhibits excellent thermal performance, and has drawn attention of many researchers for improving heat conduction and thermal dissipation. If the graphene platelets can be well dispersed to manufacture high quality thermal elements, the conduction and dissipation efficiency for the whole system can be improved and electrical performance of individual elements is greatly enhanced. However, it is more difficult to prepare a good dispersing solution for graphene platelets than the carbon nanotubes because the graphene platelets are quite different from ordinary powder and have higher specific surface area than the carbon nanotubes. The graphene platelets easily congregate together in the mixing process, thereby limiting the actual application field. Therefore, one technical problem for practically applying graphene is that a thin film formed of a mono layer of graphene with high homogeneousness is hard to obtain. If the graphene platelets are kept in contact and electrically connected together, congregation or inhomogeneous stacking is almost inevitable.

In the prior arts, some three dimensional spacers are formed to solve the above issue by blending a specific material having a different space dimension to separate the individual graphene platelets such as spherical nanoparticles, carbon nanotubes or metal nanothreads. After the spacers and the graphene powder are well mixed, congregation is effectively suppressed. For the applications requiring high electrical conductivity, the metal nanoparticles as good electrical conductors are suitable for the spacers. However, the prior arts still encounter many constraints in other applications.

U.S. Pat. No. 8,315,039 B2 disclosed graphene platelets modified for a super capacitor. Specifically, the modified graphene platelets are formed by combining metal salt and graphene platelets. The metal salt is preferably metal oxide, carbide or nitride. In addition, the surface of the graphene platelet further forms a bump shape served as the spacer such that the specific surface area of the modified graphene platelet is up to 500-1800 $m^2/g$. The modified graphene platelets can be further functionalized to manufacture the super capacitor with capacitance up to 298 F/g. While such kind of modified graphene platelets possesses considerably high capacitance, the metal salt substantially affects or interferes with physical contact of the graphene platelets. As a result, electrical and thermal performance is greatly and adversely affected.

In another US patent, 20140030590 A1, graphene electrodes for energy storage are mentioned. The spacers and the graphene platelets are mixed without any liquid solvent to improve tap density and increase energy capacity. In consideration of crosslinking for actual applications, the spacers are selected from resin, rubber or other elastomers, and have a diameter less than 1 µm. Particularly, the mixing ratio is between 0.2-20%. The spacers effectively prevent the graphene platelets from stacking or congregating, and also help the resin uniformly cover the surface of the graphene platelets during the process of thermal auxiliary solidification for manufacturing the electrodes. However, the spacers in a form of particles are not well dispersed with the graphene platelets in the solid phase mixture. As a result, the gap among the graphene platelets stacking together is narrow, thereby greatly limiting the allowable particle size of the spacers.

Therefore, it greatly needs a composite structure of graphene and carbon nanotube and a method of manufacturing the same, wherein the carbon nanotubes are vertically formed on the planar surfaces of the graphene platelets so as to effectively separate the graphene platelets and particularly implement a network structure possessing excellent properties such as thermal conductivity and electrical conductivity, thereby overcoming the problems in the prior arts.

SUMMARY OF THE INVENTION

The primary objective of the present invention is to provide a composite structure comprising a plurality of graphene platelets and a plurality of carbon nanotubes with an axial direction of each carbon nanotube perpendicular to a planar direction of a planar surface of the corresponding graphene platelet. Specifically, the graphene platelet has a thickness between 1 nm and 50 nm, a lateral dimension between 1 μm and 100 μm, an oxygen content specified for oxygen contained in the composite structure by a weight percent less than 3% of a weight of the composite structure, a carbon content specified for carbon contained in the composite structure by a weight percent greater than 95% of the weight of the composite structure, and a specific surface area between 20 and 750 $m^2/g$. A ratio of the lateral dimension to the thickness is between 10 and 10,000. The tap density of the graphene platelets is between 0.01 and 0.1 $g/cm^3$, and the tap density of the whole composite structure is less than 0.03 $g/cm^3$.

Another objective of the present invention is to provide a method of manufacturing the composite structure, comprising the processing steps of graphene platelets preparation, chemical precipitation, chemical reduction and carbon nanotube growth. Metal particles are formed and deposited on the graphene platelets through the steps of chemical precipitation and chemical reduction, and the carbon nanotubes are then formed on the metal particles through a thermal treatment.

First, in the step of graphene platelets preparation, the graphene platelets are prepared, and each graphene platelet is formed of N graphene layers, where N is a positive integer between 1 and 1,000. Next, the step of chemical precipitation is performed by dispersing the graphene platelets in a solution comprising a meal salt precursor, forming the metal salt from the solution through precipitation, and depositing the metal salt onto the surfaces of the graphene platelets.

In the step of chemical reduction, the graphene platelets with the metal salt on the surfaces are treated by chemical reduction at a high temperature so as to cause the metal salt to thermally decompose into a plurality of metal particles. The step of growing carbon nanotubes is performed by supplying a gaseous carbon source and a reducing gas for the graphene platelets, and forming the carbon nanotubes on the metal particles by a thermal treatment.

The carbon nanotubes formed perpendicular to the corresponding graphene platelets construct a three dimensional spacer, which effectively separates each discrete graphene platelet and prevents the graphene platelets from congregating together, thereby enhancing the performance of the graphene platelets.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
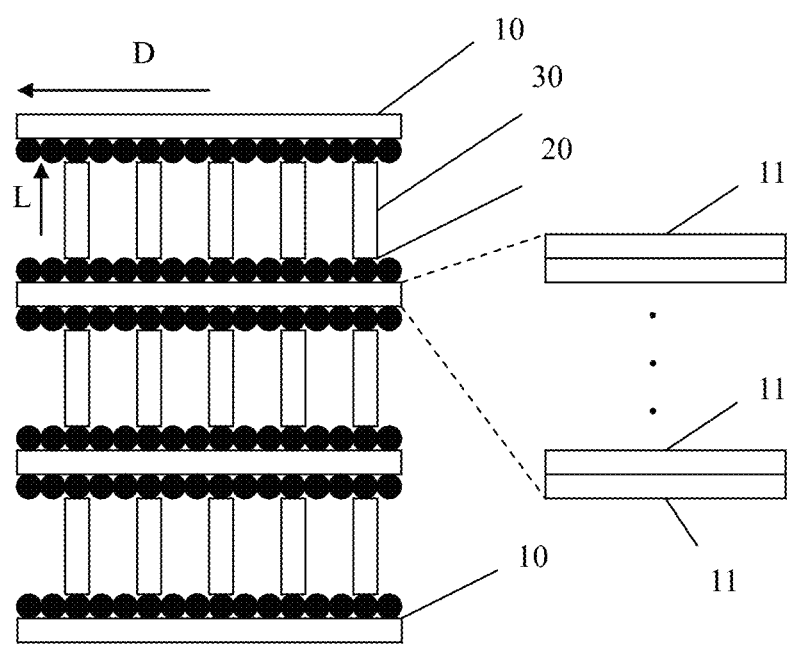
FIG. 1 is a view showing the composite structure of graphene and carbon nanotube according to the first embodiment of the present invention.

Please refer to FIG. 1 illustrating the composite structure of graphene and carbon nanotube according to the first embodiment of the present invention. It should be noted that the thickness, size, shape, arrangement and configuration of the primary elements of the embodiments are only for clearly explaining the aspects of the present invention, but not intended to limit the scope of the present invention.

As shown in FIG. 1, the composite structure 1 of graphene and carbon nanotube according to the first embodiment is generally a three dimensional structure and comprises a plurality of graphene platelets 10, a plurality of metal particles 20 and a plurality of carbon nanotubes 30. Each graphene platelet 10 is a form of thin sheet, the metal particles 20 are provided on the graphene platelets 10, and the carbon nanotubes 30 grow on the metal particles 20 and are perpendicular to the corresponding graphene platelet 10. In other words, the axial direction L of the carbon nanotube 30 is specifically configured to be perpendicular to the planar direction D along the planar surface of the graphene platelet 10. Also, the carbon nanotubes 30 are arranged in parallel and connected to the graphene platelets 10 via the metal particles 20, thereby forming the composite structure 1 of the first embodiment.

Specifically, each graphene platelet 10 is formed of N graphene layers, and N is a positive integer between 1 and 1,000. The packing density of the graphene platelets 10 is between 0.01 and 0.1 $g/cm^3$. In addition, each graphene platelet 10 has a thickness between 1 nm and 50 nm, a lateral dimension between 1 μm and 100 μm, an oxygen content specified for oxygen contained in the composite structure by a weight percent less than 3% of a weight of the composite structure, a carbon content specified for carbon contained in the composite structure by a weight percent greater than 95% of the weight of the composite structure, and a specific surface area between 20 and 750 $m^2/g$. A ratio of the lateral dimension to the thickness is between 10 and 10,000.

The above metal particle 20 comprises at least one of copper, nickel and iron, and the carbon nanotubes 30 grow on the corresponding metal particle 20 and are perpendicular to the planar direction D of the graphene platelet 10.

Furthermore, if the iron metal particles are used for the metal particle 20 as the catalyst medium to help the carbon nanotubes 30 to grow, the final composite structure 1 is magnetic because iron inherently possesses magnetism. Also, the tap density of the whole composite structure 1 is less than 0.03 $g/cm^3$.

Additionally, the graphene platelets 10 are separated by the three dimensional spacer formed of the carbon nanotubes 30. To form the carbon nanotubes 30, the carbon atoms are first generated due to catalysis or decomposition-eutectic effect when the gaseous carbon source contacts the metal particles 20. Specifically, the graphene platelets 10 and the carbon atoms are bound together via chemical bonding such that the carbon nanotubes 30 orderly grow along a direction perpendicular to the planar surface of the graphene platelet 10.

Figure 2:
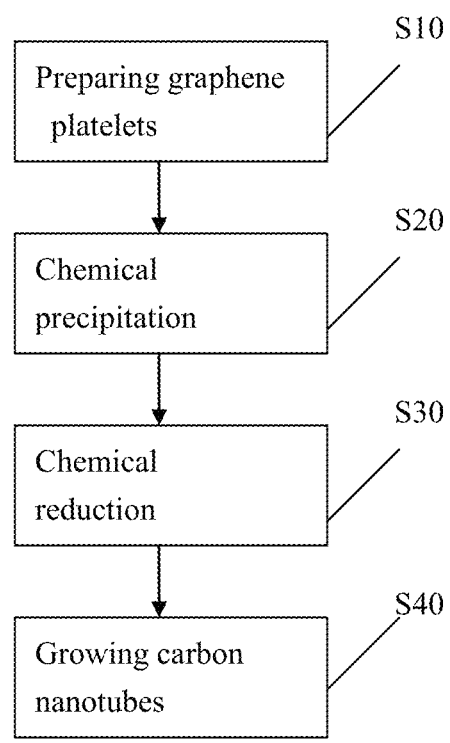
FIG. 2 is a flowchart showing the method of manufacturing the composite structure of graphene and carbon nanotube according to the second embodiment of the present invention.

Referring to FIG. 2, a flowchart illustrates the method of manufacturing the composite structure of graphene and carbon nanotube according to the second embodiment of the present invention. The method substantially comprises the sequential processing steps of preparing graphene platelets S10, chemical precipitation S20, chemical reduction S30 and growing carbon nanotube S40 for manufacturing the composite structure which is described in the above first embodiment.

First, the method according to the second embodiment of the present invention begins at the step of preparing graphene platelets S10. The graphene platelets are prepared, and each graphene platelet is formed of N graphene layers, where N is a positive integer between 1 and 1,000. The graphene platelets of the second embodiment are similar to the graphene platelets of the first embodiment mentioned above, and have the same aspects like a packing density, a thickness, a lateral dimension, an oxygen content, a carbon content, a specific surface area and a ratio of the lateral dimension to the thickness. Thus, the detailed description about these elements is omitted hereinafter.

Next, in the step of chemical precipitation S20, the graphene platelets are dispersed in the solution comprising the metal salt precursor, and the metal salt is generated from the solution through precipitation and deposited on the surface of the graphene platelets. Thus, the graphene platelets are covered or coated with the metal salt. It is preferred that the metal salt precursor comprises at least one metal element selected from copper, nickel and iron, and the metal salt comprises at least one of copper, nickel and iron salt.

The chemical reduction S30 is then performed. The graphene platelets with the metal salt are placed at a high temperature for a thermal reduction treatment. For example, the high temperature is greater than 200° C. and less than 1200° C. At this time, the metal salt thermally decomposes and is reduced to form a plurality of metal particles. The metal particles comprise at least one of copper, nickel and iron. The step S30 is preferably performed in a protective gas comprising a reducing gas like hydrogen gas.

At the final step S40, the gaseous carbon source and the reducing gas are injected to contact the graphene platelets coated with the metal particles, and a thermal treatment is then performed to cause chemical reduction for the carbon element of the gaseous carbon source such that the carbon nanotubes grow on the surface of the graphene platelets. Therefore, the composite structure of graphene and carbon nanotube is obtained. In particular, the axial direction of the carbon nanotube is perpendicular to the planar direction of the graphene platelet.

It is preferred that the gaseous carbon source used in the step of growing carbon nanotube S40 may comprise carbon hydrogen compound like methane, and the processing temperature in the thermal treatment is greater than 800° C. and less than 1500° C.

To more clearly explain the key features of the present invention, the following example will be described in detail to help those who are skilled in this field well understand the actual operation of the method of the present invention.

EXAMPLE 1

Figure 3:
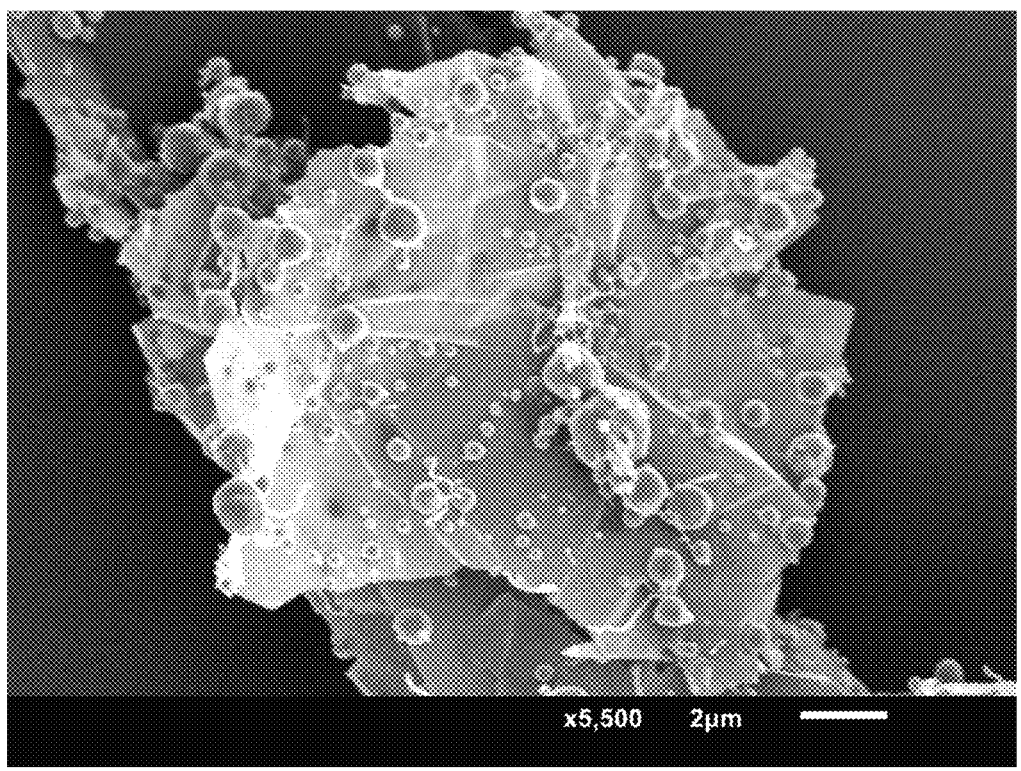
FIG. 3 is a SEM photo showing the graphene platelets.
Figure 4:
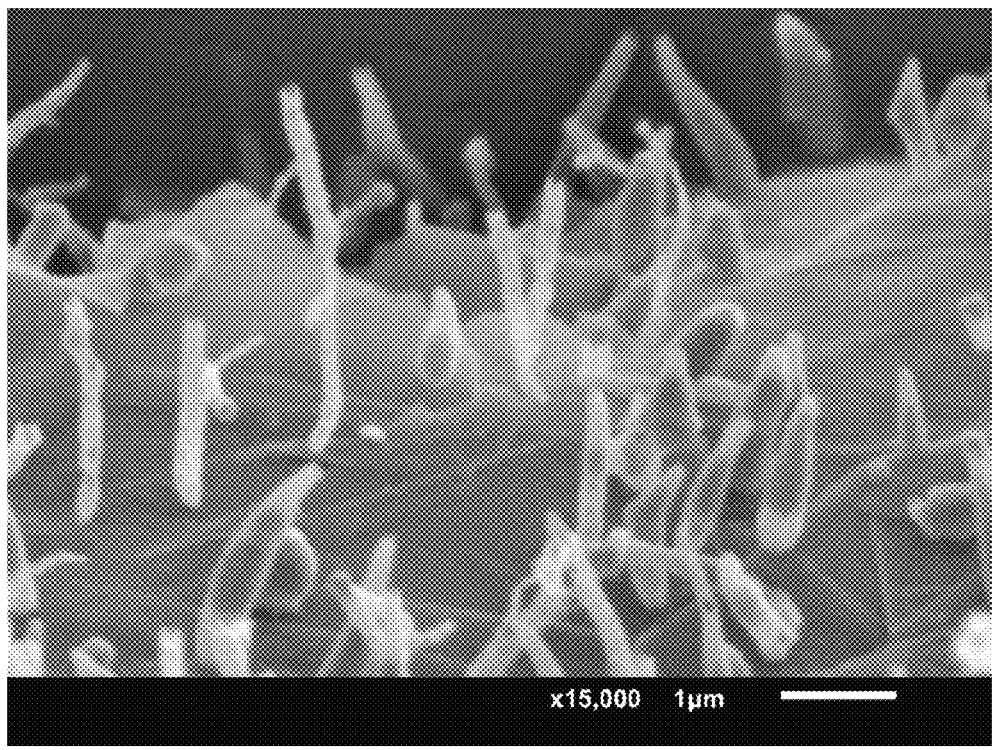
FIG. 4 is a SEM photo showing the composite structure of the present invention.
Figure 4:
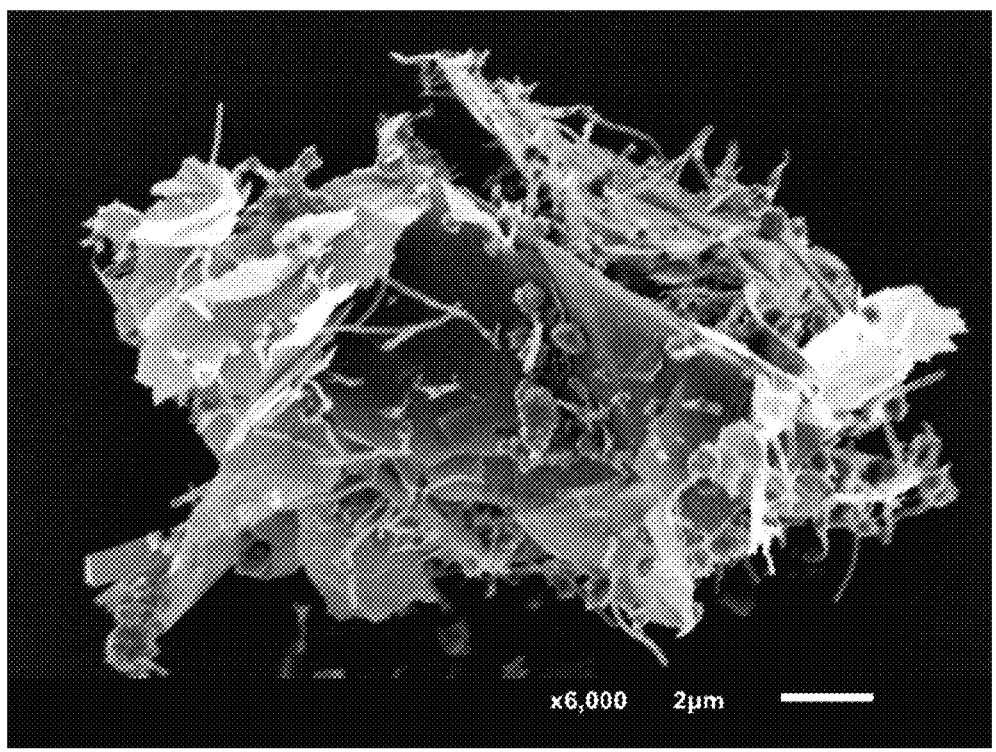

The composite structure of graphene and carbon nanotube is obtained by growing the carbon nanotubes via the reduced copper particles deposited on the planar surface of the graphene platelets. The lateral dimension of the graphene platelet is selected as about 20 μm, and the specific surface area is about 350 $m^2$/g. In the step of chemical precipitation, the graphene platelets are added into a 0.08 M copper sulfate solution, and some dispersants are further added to help the graphene platelets disperse and float. The copper salt precursor thus precipitates and is deposited on the surface of the graphene platelets. Next, the graphene platelets coated with the copper salt precursor is placed into an oven, which is injected by a gaseous mixture of hydrogen and argon. The oven is heated up to about 650° C., and then kept for one hour so as to form the copper particles adhering to the surface of the graphene platelets. The graphene platelets are inspected by a SEM (scanning electronic microscope), as shown in FIG. 3. Finally, the graphene platelets with the copper particles are placed into another oven or the same oven heated up to 800° C. or above, and a mixture of methane and argon is then injected for one hour. After cooling down, the composite structure of graphene and carbon nanotube is obtained in a form of powder, which is examined by the SEM as shown in FIG. 4.

From the above-mentioned, one aspect of the present invention is that the composite structure of graphene and carbon nanotube employs the carbon nanotubes in a form of three dimension spacer to effectively separate the graphene platelets such that the graphene platelets are difficult to congregate together. In addition, the excellent properties of the carbon nanotubes can be further used to enhance the performance of the graphene platelets in the actual applications.

Another aspect of the present invention is that the steps of graphene platelets preparation, chemical precipitation, chemical reduction and carbon nanotube growth for manufacturing the composite structure of graphene and carbon nanotube can be easily implemented through traditional equipments without developing any specific new equipment. The present invention is thus advantageous in manufacturing cost, thereby improving industrial utility.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of manufacturing a composite structure of graphene and carbon nanotube configured in a three-dimensional form, comprising sequential steps of:

graphene platelets preparation, performed by preparing graphene platelets and each of the graphene platelets formed of N graphene layers, wherein N is a positive integer between 1 and 1,000;

chemical precipitation, performed by dispersing the graphene platelets in a solution comprising a metal salt precursor, forming the metal salt from the solution through precipitation, and depositing the metal salt onto surfaces of the graphene platelets;

chemical reduction, performed by placing the graphene platelets decorated with metal salt at a high temperature for a thermal reduction treatment such that the metal salt thermally decomposes and is reduced to form a plurality of metal particles; and carbon nanotubes growth step, performed by supplying a gaseous carbon source and a reducing gas for the graphene platelets, and forming the carbon nanotubes on the metal particles by a thermal treatment, wherein each graphene platelet has a planar direction along a planar surface of the graphene platelet, and an axial direction of the carbon nanotube is perpendicular to the planar direction.

2. The method claimed in claim 1, wherein the graphene platelets have a tap density between 0.01 and 0.1 g/cm$^3$, each of the graphene platelet has a thickness, a lateral dimension, an oxygen content, a carbon content and a specific surface area, wherein the thickness is between 1 nm and 50 nm, the lateral dimension is between 1 μm and 100 μm, the oxygen content is specified for oxygen contained in the composite structure by a weight percent less than 3% of a weight of the composite structure, the carbon content is specified for carbon contained in the composite structure by a weight percent greater than 95% of the weight of the composite structure, the specific surface area is between 20 and 750 m$^2$/g, and a ratio of the lateral dimension to the thickness is between 10 and 10,000.

3. The method as claimed in claim 1, wherein the precursor comprises at least one metallic element of copper, nickel and iron, and the metal salt comprises at least one salt formed of copper, nickel and iron salts.

4. The method as claimed in claim 1, wherein the step of chemical reduction is performed in a protective gas, the protective gas contains a reducing gas, the reducing gas comprises a hydrogen gas, and the high temperature is greater than 200° C. and less than 1200° C.

5. The method as claimed in claim 1, wherein the carbon source in the step of carbon nanotubes growth is selected from a group of a gaseous hydrogen carbon compounds comprising methane.

6. The method as claimed in claim 1, wherein the thermal treatment in the step of carbon nanotubes growth is performed at a temperature greater than 800° C. and less than 1500° C.

\* \* \* \* \*